(12) United States Patent
Herrmann et al.

(10) Patent No.: US 10,690,601 B2
(45) Date of Patent: Jun. 23, 2020

(54) METHOD AND DEVICE FOR COMPENSATING FOR A MATERIAL WEB OFFSET IN MATERIAL WEB INSPECTION

(71) Applicant: Texmag GmbH Vertrlebsgesellschaft, Thalwil (CH)

(72) Inventors: Markus Herrmann, Augsburg (DE); Manfred Kroehn, Augsburg (DE)

(73) Assignee: Texmag GmbH Vertriebsgesellschaft, Thalwil (CH)

( * ) Notice: Subject to any disclaimer, the term of this patent is extended or adjusted under 35 U.S.C. 154(b) by 284 days.

(21) Appl. No.: 15/789,232

(22) Filed: Oct. 20, 2017

(65) Prior Publication Data

US 2018/0113078 A1  Apr. 26, 2018

(30) Foreign Application Priority Data

Oct. 21, 2016  (DE) .................. 10 2016 220 759

(51) Int. Cl.
*H04N 7/18* (2006.01)
*G01N 21/88* (2006.01)
(Continued)

(52) U.S. Cl.
CPC ..... *G01N 21/8851* (2013.01); *G01N 21/8901* (2013.01); *G01N 21/8903* (2013.01);
(Continued)

(58) Field of Classification Search
CPC ............. G01N 2021/891; G01N 21/86; G01N 21/8803; G01N 21/89; G01N 21/8901;
(Continued)

(56) References Cited

U.S. PATENT DOCUMENTS

2010/0214416 A1  8/2010  Ruuska
2011/0205384 A1  8/2011  Zarnowski
(Continued)

FOREIGN PATENT DOCUMENTS

DE        103 01 379 A1      7/2004
DE    102004014532 B3  *  3/2005  .......... G01N 21/8806
(Continued)

OTHER PUBLICATIONS

European Patent Office Search Report for European Patent Application No. 17195916.6 dated Mar. 5, 2018.

*Primary Examiner* — Masum Billah
(74) *Attorney, Agent, or Firm* — Shumaker, Loop & Kendrick, LLP

(57) ABSTRACT

The invention relates to a device and a method for compensating for a material web offset in inspection systems for material webs which are moving in the direction of a material web length and/or a material web width. The method comprises the following steps: taking a first picture of a first portion of a material web at a first point in time with a camera which comprises a matrix chip, and taking a second picture of a second portion of the material web at a second point in time with the camera. A first active partial surface of the matrix chip is used for the first picture and a second active partial surface of the matrix chip is used for the second picture here, wherein the first active partial surface and the second active partial surface are not identical.

15 Claims, 4 Drawing Sheets

(51) Int. Cl.
  H04N 5/347    (2011.01)
  G01N 21/89    (2006.01)
  G06T 7/00     (2017.01)
  H04N 5/225    (2006.01)
  H04N 5/247    (2006.01)

(52) U.S. Cl.
  CPC ......... G06T 7/0004 (2013.01); H04N 5/2256 (2013.01); H04N 5/247 (2013.01); H04N 5/347 (2013.01); G01N 2021/8867 (2013.01); G06T 2207/30124 (2013.01)

(58) Field of Classification Search
  CPC ............ G01N 21/8903; B65H 2515/84; B65H 2220/03; B65H 2557/61; B65H 20/00; B65H 2220/09; B65H 2553/30; B65H 2553/40; B65H 2553/42; B65H 43/00
  USPC .......................................................... 348/88
  See application file for complete search history.

(56) References Cited

U.S. PATENT DOCUMENTS

| | | | |
|---|---|---|---|
| 2012/0013733 A1 | 1/2012 | Koltermann | |
| 2012/0281121 A1 | 11/2012 | Kim | |
| 2015/0077538 A1* | 3/2015 | Krebs | G01N 21/8803 |
| | | | 348/88 |

FOREIGN PATENT DOCUMENTS

| | | | | |
|---|---|---|---|---|
| DE | 10 2012 101310 B3 | 4/2013 | | |
| DE | 10 2015 105656 A1 | 10/2016 | | |
| DE | 102015105656 A1 * | 10/2016 | ............. | G03B 15/05 |

* cited by examiner

METHOD AND DEVICE FOR COMPENSATING FOR A MATERIAL WEB OFFSET IN MATERIAL WEB INSPECTION

FIELD OF THE INVENTION

The present invention relates to a method and a device for compensating for a material web offset in monitoring and inspection systems for machines with continually transported products, such as material webs.

BACKGROUND OF THE INVENTION

When products are manufactured in the form of material webs, such as printed products like labels or packaging, monitoring and/or automated quality assurance after printing is of considerable importance in order to check the printed product. In addition to automated monitoring, help with visual monitoring by an operator can also be provided here. In this type of quality assurance, the material webs are passed through monitoring or inspection systems that take pictures of the material webs. These pictures can be checked by an operator or automatically. In order to guarantee that pictures are of a high quality, the material webs may be lit for the pictures using corresponding devices.

In one particular type of inspection, what is referred to as multi-inspection, an attempt is made to capture the entire material web (100% inspection) with two types of lighting. However, more than two, in other words three, four or five types of lighting may also be used. The conditional alternating or staggered taking of pictures with different types of lighting and picture parameters means, for example, that two sequences of pictures with different information can be assessed. However, an offset is produced here between the taking of individual pictures and the sequences of pictures in the direction of movement of the material web which, for example, have been taken with incident lighting and transmitted light lighting. The effects of the offset may be greater the faster the web speed, the higher the resolution of the matrix chip and the greater the delay between the taking of pictures and sequences of pictures. In known inspection systems, an attempt is made to compensate for this offset by complex means using software and corresponding computer power because the sequences of pictures in the two (or more) types of inspection need to be laid exactly on top of one another for assessment in order to give the same referencing or the same reference (in the case of inspection errors) to the moved object. On the other hand, it is also possible to ignore a slight offset, but this is unsatisfactory. In other systems with software compensation, an algorithm is usually used to stabilize the pictures in which identical patterns are laid on top of one another after pattern matching using registration zones. However, the disadvantage with different lighting and therefore also other picture information is that it is very difficult to find identical patterns. The same lighting is actually a prerequisite here. To compensate for this using software is, on the one hand, very complex and, on the other, sometimes completely impossible or unsatisfactory in multi-inspection systems. The characteristics of the material web, which may be transparent, translucent, opaque or a mixture, may also result in unsatisfactory software compensation.

The aim of the present invention is therefore to provide a device and a method which overcome the disadvantages of software compensation.

SUMMARY OF THE INVENTION

The present invention relates to a method for compensating for a material web offset in inspection systems for material webs according to claim 1 and to a device for monitoring and/or inspecting material webs according to claim 9.

The method according to the invention for compensating for a material web offset in inspection systems for material webs which are moving in the direction of a material web length and/or a material web width comprises the following steps: taking a first picture of a first portion of a material web at a first point in time with a camera which comprises a matrix chip; and taking a second picture of a second portion of the material web at a second point in time with the camera, wherein a first active partial surface of the matrix chip is used for the first picture and a second active partial surface of the matrix chip is used for the second picture, and wherein the first active partial surface and the second active partial surface are not identical.

The dynamic adjustment of the active partial surface used by the matrix chip allows a direct and exact synchronization of two sequences of pictures of a material web and is independent of the characteristics of the material web (which are required, for example, when compensating for the offset using software). As a result of this adjustment, two (or more) sequences of pictures taken at very slightly different times can be directly captured and laid exactly on top of one another. There is therefore no need for any complex and sometimes completely impossible or at least unsatisfactory compensating for any offset in the direction of the material web length in the pictures using software evaluation. The image capture frequency can also be increased by reducing the size of the active surface of the matrix chip. This is particularly advantageous when carrying out the multi-inspection of moving objects (that is to say when inspecting them with different types of lighting). Using the method according to the invention, it is therefore possible to ensure optimal referencing (hardware compensation) of several sequences of pictures. This consequently also allows a material web to be fully inspected accurately using multi-inspection systems with different types of lighting and without using additional software compensation for referencing. This also leads to a potential saving in the required computer power.

In configurations, a size and/or a position of the first and second active partial surfaces of the matrix chip and thereby the field of vision of the camera in the direction of the material web length and/or in the direction of the material web width may be dynamically adjusted.

In configurations, which can be combined with all previously described configurations, the first portion and the second portion may be two identical material web portions. Alternatively, the first portion and the second portion may be two different material web portions.

In configurations, which can be combined with all previously described configurations, the second active partial surface may be offset compared to the first active partial surface by a prescribed offset in the direction of the material web length and/or in the direction of the material web width. This is advantageous because both an offset of the material web in the direction of the material web length and an offset of the material web in the direction of the material web width can therefore be compensated for using the hardware. This is of particular advantage if, for example, the edges of the material web cannot be captured for an offset in the direction of the material web width (with respect to possible software compensation) or the field of vision is adjusted to the use of the material web width. This allows the image capture frequency to be increased further if partial surfaces of the matrix chip that are limited both in the direction of the material web length and in the direction of the material web width are activated. Using a position sensor, it may also be possible to adjust the field of vision in the direction of the material web width to the material web width used without having to take the edges of the material web into account.

In configurations, which can be combined with all previously described configurations, the first picture may be part of a first sequence of pictures of the material web and the second picture may be part of a second sequence of pictures of the material web. A first sequence may be created with a plurality of first pictures in order to produce the first sequence of pictures of the material web and a second sequence may be created with a plurality of second pictures in order to produce the second sequence of pictures of the material web. All of the pictures in the first sequence of pictures may be taken with the first active partial surface of the matrix chip and all of the pictures in the second sequence of pictures may be taken with the second active partial surface of the matrix chip here or the second active partial surface of the matrix chip may in each case be adjusted for the pictures in the second sequence of pictures.

In configurations, which can be combined with all previously described configurations, the material web may be lit with a first type of lighting for the first and second pictures. Alternatively, the material web may be lit with a first type of lighting for the first picture and the material web may be lit with a second type of lighting for the second picture. A first picture may respectively be taken with the first type of lighting and a second picture may respectively be taken with the second type of lighting, these pictures being taken of a plurality of portions of the material web following one another in the direction of the material web length, wherein the first pictures together produce a first sequence of pictures of the material web and the second pictures produce a second sequence of pictures of the material web. At least one of the first and second sequences of pictures may be used for web monitoring and/or inspection. In particular, the first and/or the second sequences of pictures may be visually displayed for a user.

The material web may be lit in the entire field of vision of the camera for the first and/or the second picture. Alternatively, the material web may in each case be selectively lit according to the first and second active partial surfaces of the matrix chip. The material web may be lit in traversing fashion with respect to the direction of the material web width. Further pictures of corresponding further portions may also be taken at corresponding further points in time using corresponding further active partial surfaces of the matrix chip, wherein the further portions are identical to the first portion and/or the second portion. Further types of lighting may be used to light the material web for the further pictures.

The types of lighting may, for example, be selected from among incident lighting, background lighting and transmitted light lighting.

In configurations, which can be combined with all previously described configurations, a field of vision of the camera may be designed to cover at least the entire width of the material web. In particular, the field of vision of the camera in the direction of the material web width may be greater than the material web width. The first and second active partial surfaces may be adjusted on the basis of a signal from a material web position sensor, in particular a size and/or a position of the first and second active partial surfaces in the direction of the material web width.

In configurations, which can be combined with all previously described configurations, the second point in time may be offset by 0.0001 to 0.01 seconds, in particular by 0.0005 to 0.001 seconds with respect to the first point in time.

The material web may be moved at a web speed of at least 150 m/min, in particular at least 500 m/min, and preferably at least 900 m/min in the direction of the material web length.

In configurations, which can be combined with all previously described configurations, a sensor may also be provided to determine the distance travelled by or the speed of the material web in the direction of the material web length.

In configurations, which can be combined with all previously described configurations, a distance travelled by the material web in the direction of the material web length may be measured and the first point in time for the first picture and/or the second point in time for the second picture may thereby be calculated and provided to the camera.

Alternatively, a speed of the material web may be measured and a time lag between the first picture and the second picture can thereby be controlled.

In configurations, which can be combined with all previously described configurations, a plurality of cameras may be provided with a matrix chip, wherein the cameras are arranged distributed over the material web width so that the fields of vision of the cameras in the direction of the material web width adjoin one another or overlap, wherein the plurality of cameras take corresponding first and second pictures and the first and second pictures are combined to form two coherent sequences of pictures.

In configurations, which can be combined with all previously described configurations, the field of vision of the camera may be arranged in traversing fashion with respect to the direction of the material web width. In addition or alternatively, if a plurality of cameras are provided, the plurality of cameras may be arranged in traversing fashion with respect to the direction of the material web width.

In configurations, which can be combined with all previously described configurations, at least one camera may be provided on a front side of the material web and at least one camera may be provided on a rear side of the material web and first and second pictures may be taken of the front side and the rear side of the material web.

The invention also comprises a device for monitoring and/or inspecting material webs which are moving in the direction of a material web length and/or a material web width. The device comprises a camera which has a matrix chip, wherein partial surfaces of the matrix chip may be activated independently of one another, and a control unit. The control unit is designed to have a first partial surface of the matrix chip activated in order to take a first picture of a first portion of the material web at a first point in time; and to have a second partial surface of the matrix chip activated in order to take a second picture of a second portion of the material web at a second point in time, wherein the first active partial surface and the second active partial surface are not identical.

In configurations, a size and/or a position of the first and second active partial surfaces of the matrix chip and thereby the field of vision of the camera in the direction of the material web length and/or in the direction of the material web width may be dynamically adjusted.

In configurations of the device, which can be combined with all previously described configurations, the first portion and the second portion may be two identical material web portions. Alternatively, the first portion and the second portion may be two different material web portions.

In configurations of the device, which can be combined with all previously described configurations, the control unit may be designed to select the first and second active partial surfaces so that the second active partial surface is offset compared to the first active partial surface by a prescribed offset in the direction of the material web length and/or in the direction of the material web width.

In configurations of the device, which can be combined with all previously described configurations, the first picture may be part of a first sequence of pictures of the material web and the second picture may be part of a second sequence of pictures of the material web. The control unit may be designed to have a first sequence created with a plurality of first pictures in order to produce the first sequence of pictures of the material web and to have a second sequence created with a plurality of second pictures in order to produce the second sequence of pictures of the material web. The control unit may be designed to have all of the pictures in the first sequence of pictures taken with the first active partial surface of the matrix chip and all of the pictures in the second sequence of pictures taken with the second active partial surface of the matrix chip here or to have the second active partial surface of the matrix chip in each case adjusted for the pictures in the second sequence of pictures.

In configurations of the device, which can be combined with all previously described configurations, the device may have a first lighting device so that the material web may be lit with a first type of lighting for the first and second pictures. Alternatively, the device may have first and second lighting devices so that a first type of lighting may be used for the first picture of the material web and a second type of lighting may be used for the second picture of the material web. The control unit may be designed to have a first picture respectively taken with the first type of lighting and a second picture respectively taken with the second type of lighting, these pictures being taken of a plurality of portions of the material web following one another in the direction of the material web length, wherein the first pictures together produce a first sequence of pictures of the material web and the second pictures produce a second sequence of pictures of the material web. The control unit may be designed to have the material web lit in the entire field of vision of the camera for the first and/or the second picture, or to have the material web in each case selectively lit according to the first and second active partial surfaces of the matrix chip. The first and/or the second lighting devices may be arranged in traversing fashion in relation to the direction of the material web width. The control unit may be designed to have further partial surfaces of the matrix chip activated in order to take further pictures of corresponding further portions at corresponding further points in time, wherein the further portions are identical to the first portion and/or the second portion. In particular, the device may comprise further lighting devices so that the material web may be lit with further types of lighting for the further pictures. The lighting devices may be designed to provide at least one type of lighting selected from among incident lighting, background lighting and transmitted light lighting.

In configurations of the device, which can be combined with all previously described configurations, the camera may have a field of vision to cover at least the entire width of the material web. In particular, the field of vision of the camera in the direction of the material web width may be greater than the material web width. The device may also have a material web position sensor and the control unit may also be designed to have the first and second active partial surfaces adjusted on the basis of a signal from a material web position sensor, in particular to have a size and/or a position of the first and second active partial surfaces in the direction of the material web width adjusted.

In configurations of the device, which can be combined with all previously described configurations, the control unit may be designed to have the second point in time offset by 0.0001 to 0.01 seconds, in particular by 0.0005 to 0.001 seconds with respect to the first point in time.

In configurations of the device, which can be combined with all previously described configurations, a sensor may also be provided to determine the distance travelled by or the speed of the material web in the direction of the material web length.

In configurations of the device, which can be combined with all previously described configurations, the device may be designed to measure a distance travelled by the material web in the direction of the material web length and thereby to calculate the first point in time for the first picture and/or the second point in time for the second picture and provide it to the camera.

Alternatively, the device may be designed to measure the speed of the material web and thereby to control a time lag between the first picture and the second picture.

In configurations of the device, which can be combined with all previously described configurations, a plurality of cameras may be provided with a matrix chip, wherein the cameras are arranged distributed over the material web width so that the fields of vision of the plurality of cameras in the direction of the material web width adjoin one another or overlap. The control unit may be designed to have the plurality of cameras take corresponding first and second pictures and to have the first and second pictures combined to form two coherent sequences of pictures.

In configurations of the device, which can be combined with all previously described configurations, the field of vision of the camera may be arranged in traversing fashion with respect to the direction of the material web width and/or, if a plurality of cameras are provided, the plurality of cameras may be arranged in traversing fashion with respect to the direction of the material web width.

In configurations of the device, which can be combined with all previously described configurations, at least one camera may be provided on a front side of the material web and at least one camera may be provided on a rear side of the material web, wherein the control unit may be designed to have first and second pictures respectively taken of the front side and the rear side of the material web.

In configurations of the device, which can be combined with all previously described configurations, the device may also comprise a lens with a fixed focal length.

Further details and features of the invention are described by reference to the following figures.

DETAILED DESCRIPTION

The term "material web" used below is to be interpreted broadly and relates to all types of products which are automatically transported during processing and for which monitoring or inspection is required. This includes, amongst other things, printed paper products, materials and fabrics, packaging and raw materials for packaging, labels, etc. The material webs do not have to be in infinitely continuous form here, but may also be in the form of successive sheets. The device according to the invention and the method according to the invention may be used for monitoring and/or inspecting all of these products.

Figure 1:
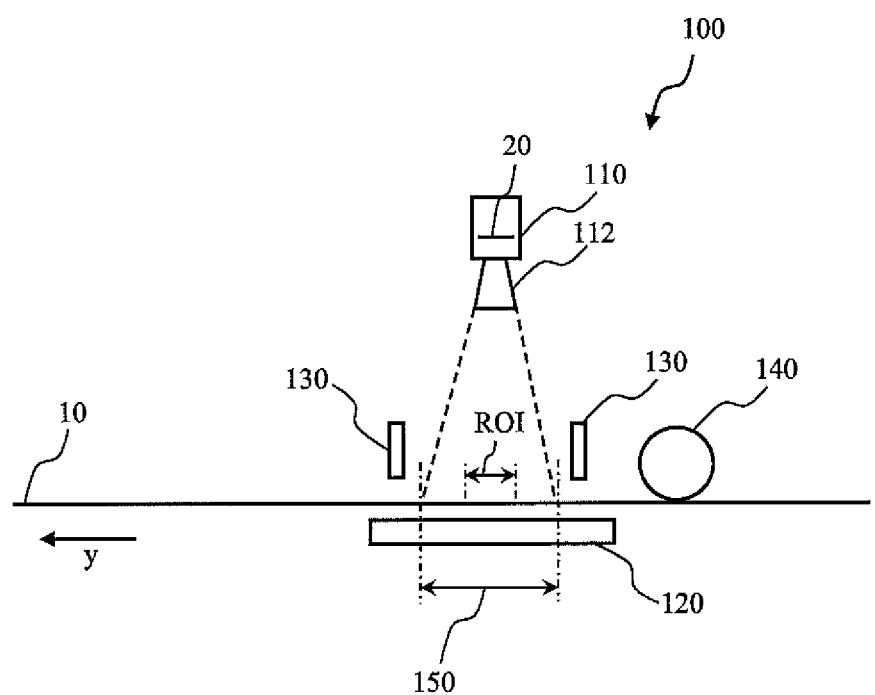
FIG. 1 shows a schematic representation of a device according to the invention for material web monitoring or material web inspection according to an exemplary embodiment.

FIG. 1 is a schematic depiction of a side view of a device 100 for monitoring and/or inspecting a material web 10. The device 100 may be used for all of the methods for compensating for a material web offset described below. In addition to monitoring the web/inspection, the device may also be used to measure color density or spectral color. The device 100 comprises a camera 110 which has a matrix chip 20, for example a CCD or CMOS sensor. The camera 110 may be suitable for 1D, 2D and/or 3D pictures and may be a color or a black-and-white camera. The camera 110 or the field of vision of the camera 110 may be arranged either in parallel or in traversing fashion with respect to the direction of the material web width x (see FIG. 2). In an embodiment not shown, an additional camera may also be provided for detailed pictures. FIG. 1 also shows different devices for lighting the material web 10. In the example shown, one or two lighting devices 130 are provided above the material web 10 and one lighting device 150 is provided below the material web 10. Alternative embodiments may also have only one lighting device or more than two lighting devices.

FIG. 1 also shows a lens 112 for the camera 110 which preferably has a fixed focal length (fixed-focus lens). In alternative configurations, a zoom lens may also be used. A sensor 140 is also provided which measures the distance travelled by or the speed of the material web. Encoders, proximity switches, print mark sensors and direct speed sensors, for example, may be used as sensors here. Use may be made, for example, of rotary encoders (incremental rotary encoders or rotary pulse encoders) which are usually used with a wheel. The wheel, having a known rolling circumference, sits on the material web and, for example, generates several pulses per rotation. The distance travelled by the material web in the direction of the material web length y can be determined by the number of pulses counted. The material web speed can then be determined, for example, by reference to the number of pulses counted per unit of time and by reference to the distance travelled, that is to say it can be calculated by reference to the time and distance values (see example hereof below). The material web 10 is preferably moved in the direction of a material web length y, but can also be moved in the direction of a material web width x (see FIG. 2). The material web 10 may, for example, be moved at a web speed of at least 150 m/min, in particular at least 500 m/min, and preferably at least 900 m/min in the direction of the material web length y.

The device 100 also comprises a control unit (not shown in FIG. 1) which controls all of the activities of the device and processes corresponding signals, for example from the sensor 140 or other external sensors. In addition, one or more monitors may be provided to visually display the pictures taken by the camera or the picture sequences created (not shown in FIG. 1).

Figure 3:
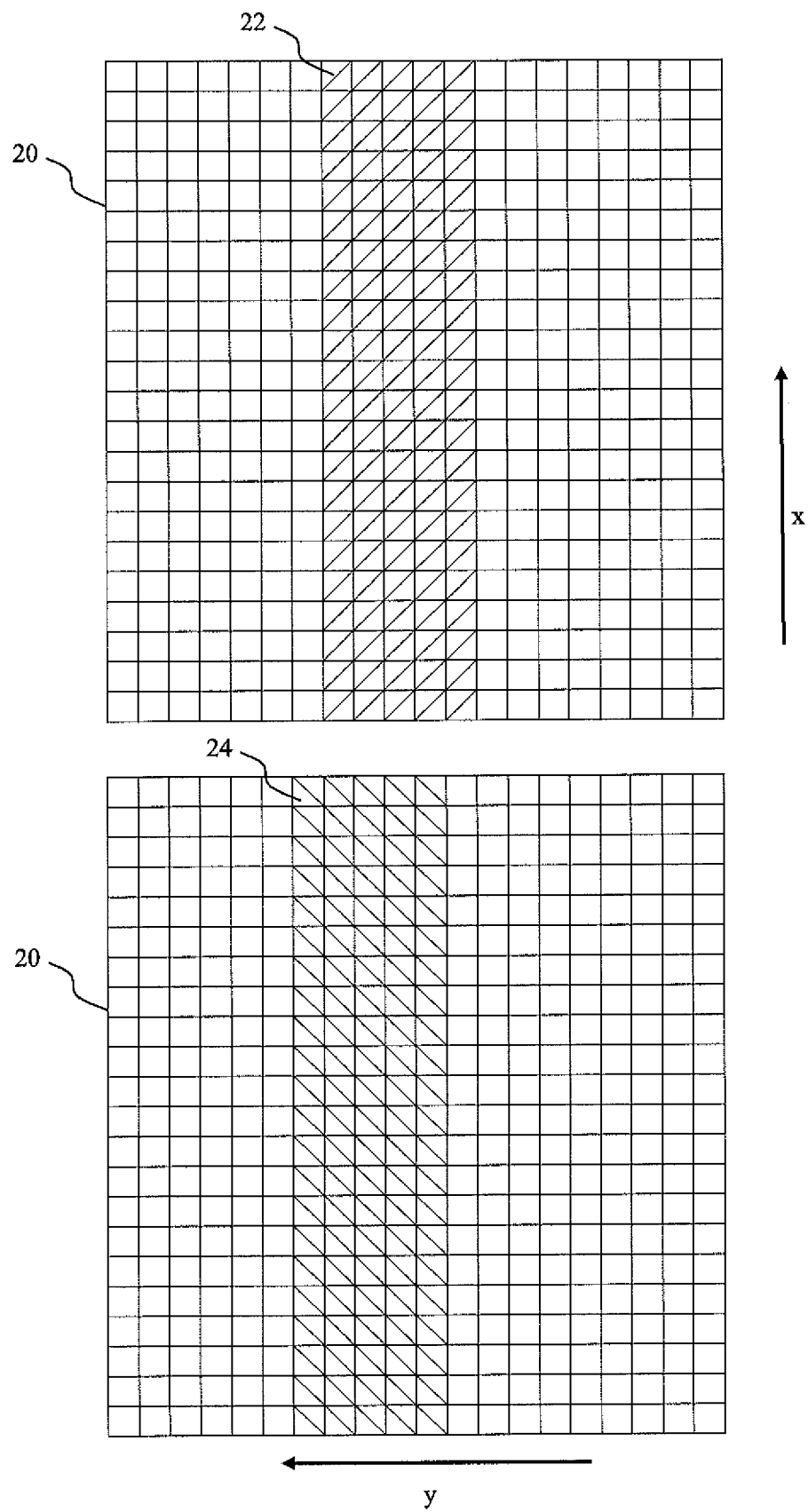
FIG. 3 shows two schematic representations of a matrix chip with correspondingly activated partial surfaces.
Figure 4:
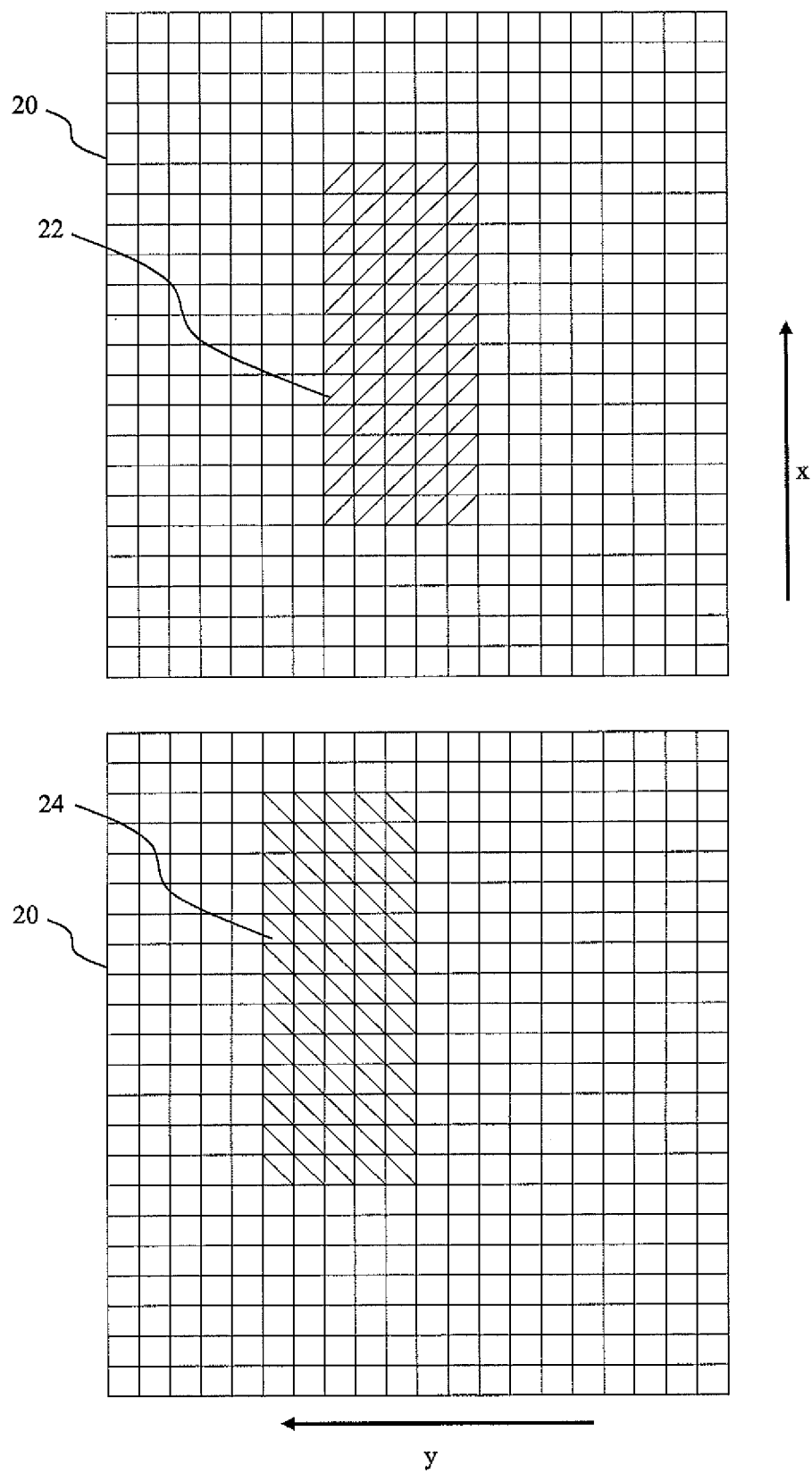
FIG. 4 shows two further schematic representations of a matrix chip with correspondingly activated partial surfaces.

As mentioned at the beginning, the method according to the invention enables a material web offset which arises in respect of two successive pictures to be compensated for without any complicated software. This is made possible by adopting the following approach: taking a first picture of a first portion of the material web 10 at a first point in time with the camera 110 which comprises the matrix chip 20, and then taking a second picture of a second portion of the material web 10 at a second point in time with the camera 110. The particular feature here is that, as shown in FIG. 3 and FIG. 4, a first active partial surface 22 of the matrix chip 20 is used for the first picture and a second active partial surface 24 of the matrix chip 20 is used for the second picture, wherein the first active partial surface and the second active partial surface are not identical.

The second point in time may be offset, for example, by 0.0001 to 0.01 seconds, in particular by 0.0005 to 0.001 seconds with respect to the first point in time.

An active surface of the matrix chip 20 is understood to be a partial surface of the matrix chip 20 which is activated for taking a picture. The principle of a "Region of Interest" (ROI, see FIG. 1) is applied here, wherein the actually active surface, that is to say the resolution, of a matrix chip 20 (as already mentioned, CMOS chips, CCD chips or chips with an FPGA, for example, may be used here) is adjusted. This means that it is not the entire surface of the chip and therefore not the maximum field of vision (the maximum field of vision 150 of the camera in the direction of the material web length y is indicated in FIG. 1), that is to say not the entire resolution of the chip, that is used, but rather just a partial surface, that is to say part of the resolution or part of the available sensor points, to take a picture. This is to be illustrated in a considerably simplified example. For example, a matrix chip may have 20×20=400 notional pixels. To be clear, it is mentioned once again here that this is a fictitious example to illustrate the principle of the invention because the matrix chips actually used have a much larger number of pixels (more than 100 megapixels). For a first picture, for example, use may be made of a first active partial surface 22 with 5×20=100 notional pixels which uses the entire width (in the x direction corresponding to the direction of the material web width) of the matrix chip 20 but only part of its length (y direction corresponding to the direction of the material web length). For a second picture, use may be made of a second active partial surface 24 which is shifted by a pixel width (of the notional pixels in the illustration in FIG. 3) in the direction of the material web length y. As far as other parameters are concerned (for example in order to compensate for a higher web speed and/or a greater time lag (delay) between the two pictures), the second picture may be shifted by more than one pixel. Alternatively, as shown in FIG. 4, for the first picture, use may also be made of an active partial surface 22 that is limited in direction x and use may be made of a second partial surface 24 correspondingly shifted in the x and y directions for the second picture. Using this method, corresponding first and second sequences of pictures may then be created by continuously taking first and second pictures with the corresponding partial surfaces 22, 24 and combining them to form sequences of pictures (of which more below).

Figure 2:
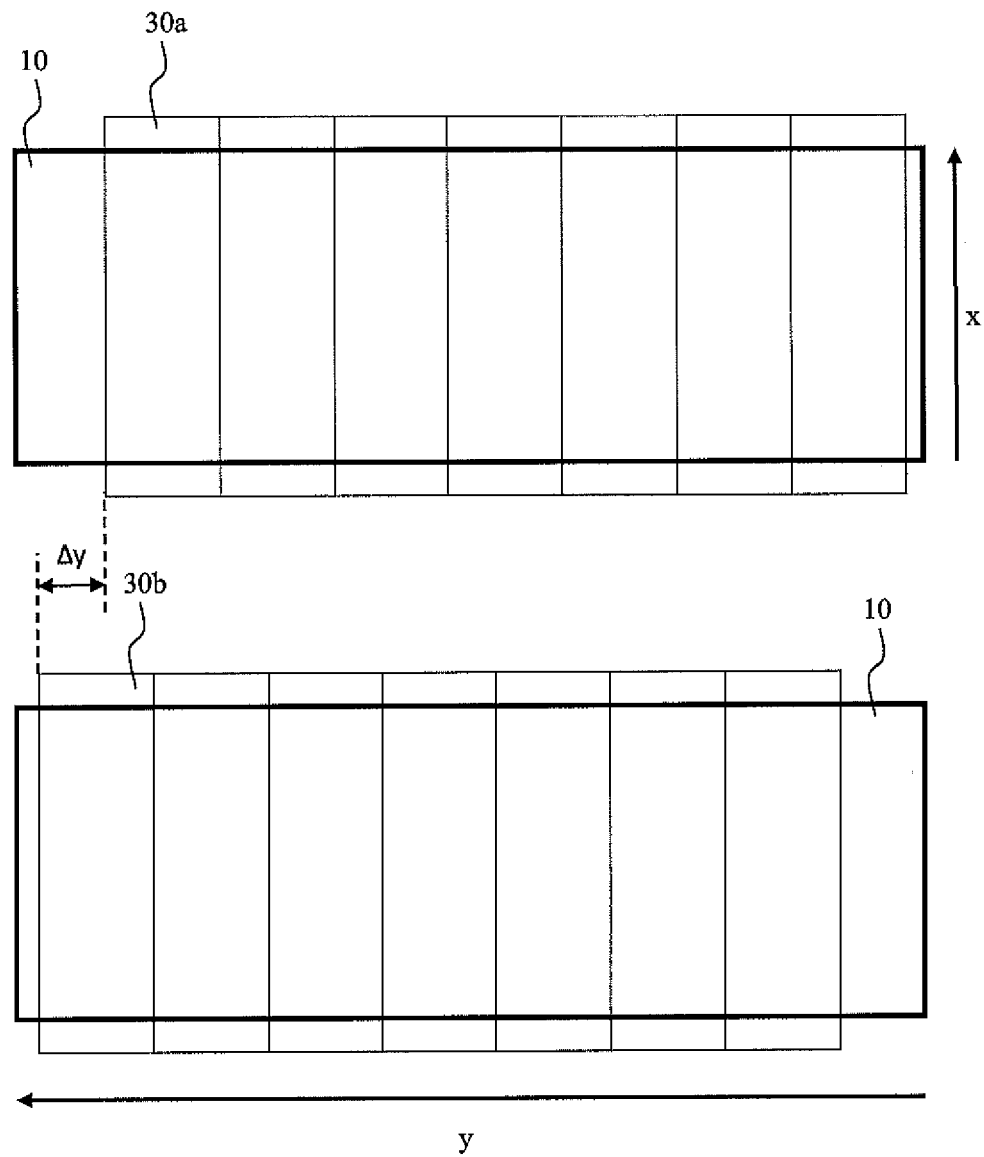
FIG. 2 shows two views of a material web with sequences of pictures laid on top.

The device and the method have numerous advantages. The dynamic adjustment of the active partial surfaces 22, 24 used by the matrix chip 20 allows a direct and exact synchronization of two sequences of pictures of a material web 10 and is independent of the characteristics of the material web 10 (which are required, for example, when compensating for the offset using software). As a result of this adjustment, two (or more) sequences of pictures taken at very slightly different times can be directly captured and laid exactly on top of one another. There is therefore no need for any complex and sometimes completely impossible or at least unsatisfactory compensating for any offset in the Y direction (see Δy in FIG. 2) in the pictures using software evaluation. To illustrate the offset in the direction of the material web length y when the material web 10 moves in this direction, two material webs 10 are shown in FIG. 2, in which web portions have respectively been captured at very slightly different points in time and these may be combined to form sequences of pictures 30a, 30b. Although, in total, these sequences of pictures respectively cover the entire material web 10 (full inspection), they are offset in the direction of movement of the material web (in this case in direction y) by Δy because the material web 10 has always moved a little further between two successive pictures as a function of the material web speed and the delay of the camera 110. The following offset Δy may, for example, arise under the following framework parameters:

Web speed (in direction y): 180 m/min≡3 m/sec≡3000 mm/sec

Camera resolution: 0.2 mm/pixel

Picture taking delay: 500 µs

This gives a line frequency of 15,000 lines/sec≡15 lines/millisecond. With a delay between two sequences of pictures of 500 microseconds (0.5 milliseconds), this would give an offset Δy of 7.5 lines or 7.5 pixels, which corresponds to 1.5 mm.

Such offsets may be dynamically compensated for directly using the device 100 according to the invention and the method according to the invention by activating corresponding partial surfaces 22, 24 of the matrix chip 20 so that identical portions may be captured in two successive pictures.

A further advantage of the invention is that the image capture frequency may be increased by reducing the size of the active surfaces 22, 24 of the matrix chip 20. This is particularly advantageous when carrying out the multi-inspection of moving objects (that is to say when inspecting them with different types of lighting). Using the method according to the invention and the device 100 according to the invention, it is therefore possible to ensure optimal referencing (hardware compensation) of several sequences of pictures. This consequently also allows a material web to be fully inspected accurately using multi-inspection systems with different types of lighting and without using additional software compensation for referencing. This also leads to a potential saving in the required computer power.

Depending on the focal length of the lens used and as a function of the ROIs used on the matrix chip, it is possible for different geometrical distortions of the picture taken and therefore for inaccuracies to arise. These may, for example, be compensated for by distortion calibration.

As shown in FIG. 3 and FIG. 4, a size and/or a position of the first and second active partial surfaces 22, 24 of the matrix chip 20 and thereby the field of vision of the camera 110 in the direction of the material web length y and/or in the direction of the material web width x may be dynamically adjusted. Factors which also influence the adjustment of the active partial surfaces are, for example, the current web speed (for example measured by the sensor 140), the current camera resolution and the current delay between taking two pictures, wherein the delay may either be fixed in advance or may be dynamically adjusted (see in relation hereto the example below). These factors may be taken into account immediately and directly in the matrix chip 20 through adjustment of the active partial surfaces 22, 24, as a result of which, for example, dynamic deviations in these factors may also be compensated for. Provision may also be made, for example, of a position sensor which determines a position and a width of the material web (in the x direction). The signals from this sensor may also directly influence the adjustment of the active partial surfaces 22, 24.

As mentioned above, the device may be used for different applications. For example, the first portion and the second portion may be two identical material web portions. This means that the same portion of the material web 10 is pictured twice in order, for example, to be able to use two different types of lighting in multi-inspection. Use may also be made of more than two types of lighting and a corresponding number of pictures may be taken. Alternatively, the first portion and the second portion may be two different material web portions. Two different portions of the material web are then pictured, but also with different active partial surfaces 22, 24 in order, for example, to be able to compensate for a sudden deviation in a condition relating to the offset of the material web 10 in the direction of the material web length y or of the material web width x. This may, for example, be used in devices with just one type of lighting. These are just one-off compensations, in other words only a single change, triggered by a specific event, for the pictures taken by the camera 110 from the first active partial surface 22 of the matrix chip 20 to the second active partial surface 24 of the matrix chip 20. Such an event may, for example, be a sudden increase in the material web speed (and therefore a kind of offset such as offset Δy of the material web 10 in the direction of the material web length y in FIG. 2) or a slipping of the material web transversely to the direction of movement (offset of the material web 10 in the direction of the material web width x).

As shown in FIG. 3 or FIG. 4, the second active partial surface 24 may be offset compared to the first active partial surface 22 by a prescribed offset in the direction of the material web length y and/or in the direction of the material web width x. This is advantageous because it is therefore possible to compensate for both an offset Δy of the material web 10 in the y direction and also then an offset of the material web 10 in the x direction using the hardware. This is of particular advantage if, for example, the edges of the material web cannot be captured for an offset in the x direction (with respect to possible software compensation) or the field of vision of the camera 110 is adjusted to the actual use of the material web 10. It is possible to increase the image capture frequency further if partial surfaces of the matrix chip 20 that are limited both in the x direction and in the y direction are activated. Using the abovementioned position sensor, it may also be possible to adjust the field of vision in the x direction to the material web width without having to take the edges of the material web into account.

The first picture may be part of a first sequence of pictures of the material web 10 and the second picture may be part of a second sequence of pictures of the material web 10. The first sequence of pictures of the material web 10 is created from a plurality of first pictures and the second sequence of pictures is created from a plurality of second pictures here. Provision may be made for all of the pictures in the first sequence of pictures to be taken with the first active partial surface 22 of the matrix chip 20 and all of the pictures in the second sequence of pictures to be taken with the second active partial surface 24 of the matrix chip 20. It is also possible for the second active partial surfaces 24 of the matrix chip to be adjusted in each case for the pictures in the second sequence of pictures. Factors such as the current web speed, the current camera resolution and the current delay between taking two pictures may be taken into account here.

As shown in FIG. 1, the device has different lighting devices. The material web 10 may be lit with the same first type of lighting (for example with lighting device 130) for the first and second pictures. Alternatively, the material web 10 may be lit with a first type of lighting (for example with lighting device 130) for the first picture and the material web 10 may be lit with a second type of lighting (for example with lighting device 120) for the second picture. As far as multi-inspection is concerned, a first picture may respectively be taken with the first type of lighting and a second picture may respectively be taken with the second type of lighting, these pictures being taken of a plurality of portions of the material web 10 following one another in the direction of the material web length y, wherein the first pictures together produce the first sequence of pictures of the material web 10 and the second pictures produce the second sequence of pictures of the material web 10. The sequences of pictures generated in this way may then, for example, be visually displayed for a user on one or more monitors. For example, in a sequence of pictures for inspection, web monitoring may also be carried out simultaneously by a user. Alternatively, however, web monitoring may also be carried out using a separate sequence of pictures.

According to the lighting devices 120, 130 used, the material web 10 may be lit in the entire field of vision 150 of the camera 110 for the first and/or the second picture or alternatively in each case selectively lit according to the first and second active partial surfaces 22, 24 of the matrix chip. It is also possible for the material web 10 to be lit in traversing fashion with respect to the direction of the material web width x.

In addition to a multi-inspection with two sequences of pictures, the device may also be used for multi-inspection with three or more sequences of pictures. For this purpose, further pictures of corresponding further portions are then taken at corresponding further points in time using corresponding further active partial surfaces of the matrix chip 20, wherein the further portions are identical to the first portion and/or the second portion. Further types of lighting may be used to light the material web 10 for these further pictures. Further lighting devices may of course be provided in addition to the lighting devices 120, 130 shown. The types of lighting may, for example, be selected from among incident lighting, background lighting and transmitted light lighting. A series of lighting properties may be provided here: homogeneous or inhomogeneous lighting, direct, diffuse, focused or collimated lighting, coaxial, transmissive and/or polarized lighting, different lighting angles and light field or dark field lighting, light wavelengths in the UV, visible or IR range (in order, for example, to be able to inspect security features too), single-colored (monochrome), multicolored (polychrome) or color matchable or controllable (RGB) lighting, surface lighting or line lighting, and constant or flash lighting. In the case of incident lighting and transmitted light lighting, these may be used alternately or at the same time. The lighting devices may be configured as a tunnel lighting system, a tube lighting system or a dome lighting system, and may be adjusted modularly or to the material web width. Light bulbs, glow-discharge lamps, LED lighting, OLED lighting or laser lighting, for example, may be used as means of lighting. The respective types of lighting and properties may be used, for example, for the following multi-inspection: Printed image inspection with visible incident light, label inspection with visible transmitted light and inspection of UV security features with UV incident light.

The field of vision of the camera 110 may be designed to cover at least the entire width of the material web. As already described above, the field of vision of the camera 110 in the direction of the material web width x may, in particular, be greater than the material web width. The first and second active partial surfaces 22, 24 may be adjusted on the basis of a signal from the material web position sensor (not shown in FIG. 1), in particular a size and/or a position of the first and second active partial surfaces 22, 24 in the direction of the material web width x. In addition to the position of the material web 10, the following factors may in turn also influence the adjustment of the active partial surfaces 22, 24: the current web speed, the current camera resolution and the current delay between taking two pictures.

The delay, that is to say the time lag between the first and the second picture, may either be fixed in advance or adjusted according to the material web movement. The delay here is a function of a first trigger which triggers the first picture (at the first point in time) and a second trigger which triggers the second picture (at a second point in time). The material web offset $\Delta y$ is produced because of the delay between the first trigger and the second trigger (see FIG. 2). As already mentioned, a time lag between these two triggers (that is to say the two pictures) may be fixed in advance and has a lower limit, for example, based on the maximum image capture frequency of the camera 110. However, the first and second points in time for the two triggers, that is to say the delay, may also be dynamically adjusted. The abovementioned sensor 140 may be used here to measure the distance travelled by or the speed of the material web 10. This is to be described below by reference to a simple numerical example for a sensor with a wheel. The information for controlling the trigger is provided, for example, by an encoder. This encoder is coupled to the wheel and emits a certain number of pulses, for example 2048, per rotation of the wheel. If the wheel, for example, has a diameter of 100 mm, then this gives a rolling circumference of 100 mm*$\pi$=314.16 mm and a distance travelled by the material web in the direction of the material web lengthy of 314.16 mm/2048 pulses per rotation, which corresponds to approximately 0.15 mm per pulse. When using a sensor with a resolution of, for example, 1600×1200 pixels and a width of the material web in direction x of 350 mm, this gives 350 mm/1600 pixels=0.22 mm per pixel in the x direction (with coverage of the entire material web width) and, because a matrix chip is being used, also 0.22 mm per pixel in the y direction. Assuming that offset $\Delta y$ corresponds to 132 mm and using the wheel/encoder combination described above, this gives 132 mm/0.15 mm per pulse=880 pulses of the encoder. This means that 880 pulses of the encoder have been recorded between the triggering of the first trigger for the first picture and the triggering of the second trigger for the second picture. The second picture is therefore taken with an offset of $\Delta y$ 132 mm. Since the 132 mm offset of $\Delta y$ corresponds to 600 pixels in the matrix chip example, the ROI for the second picture therefore has to be offset by 600 pixels in the direction of the material web length y in order to capture the same material web portion (with different lighting). The correction value for the ROI may therefore be determined by the number of pulses. The first point in time for the first trigger or the first picture and the second point in time for the second trigger or the second picture may therefore be determined by the distance travelled by the wheel and the pulses of the encoder. For example, the first picture may be taken after a first number of pulses and the second picture may be taken after a second number of pulses. In continuous operation, the number of pulses is usually constant here because the material web portions overall are supposed to cover all of the material web respectively. By changing the material web speed, only the time between the first pictures and the second pictures then changes, not the number of pulses between the first pictures and the second pictures. In other words, the distance travelled by the material web remains the same but the time lag between the pictures changes and is adjusted. This means that, with a sensor that can measure distance (wheel with an encoder), a corresponding triggering of the first and second pictures and a correction of the ROI may be carried out.

However, this process may also be used, for example, to compensate for different material web speeds because the triggering only depends on the prescribed number of pulses which is in turn reached at an earlier or later point in time depending on the web speed. In other words, by means of the sensor 140, for example, different material web speeds may be taken into account when starting or stopping or also within a working process and the (points in time of the) first and second pictures of the camera 110 may be adjusted accordingly. The number of pulses that are awaited in each case may, for example, be determined as a function of the characteristics and the resolution of the matrix sensor 20 used.

For the triggering, use may be made, for example, of the abovementioned control unit or a control device which, for this purpose, receives information from the sensor 140 in order to send a trigger signal for the first pictures and the second pictures to the camera 110. The control unit or the control device may be provided as an external instrument. However, it is also possible for such a device or control logic to be installed directly in the camera 110. Therefore, the sensor 140 may, for example, be connected directly to the control device or to the camera 110.

In addition to the embodiment with a camera 110 shown in FIG. 1, it is also possible to equip the device 100 with a plurality of cameras with a matrix chip 20, wherein the cameras are then arranged distributed over the material web width so that the fields of vision of the cameras in the direction of the material web width x adjoin one another or overlap. The plurality of cameras then take corresponding first and second pictures, wherein the first and second pictures are combined to form two coherent sequences of pictures. If a plurality of cameras are used, these may be arranged in traversing fashion with respect to the direction of the material web width x. Mechanical offsets of the cameras with respect to one another in the direction of the material web length y can also be compensated for through a corresponding selection of active partial surfaces of the matrix chips 20.

Provision may also be made for at least one camera 110 to be arranged on a front side of the material web 10 and at least one camera to be arranged on a rear side of the material web 10, these respectively taking first and second pictures of the front side and the rear side of the material web 10. This makes it possible to monitor or inspect both sides of the material web.

Although the present invention has been described above and is defined in the attached claims, it should be understood that the invention may alternatively also be defined according to the following embodiments:

We claim:

1. A method for compensating for a material web offset in inspection systems for material webs which are moving in the direction of a material web length (y) and/or a material web width (x), wherein the method comprises the following steps:
   taking a first picture of a first portion of a material web at a first point in time with a camera which comprises a matrix chip; and
   taking a second picture of a second portion of the material web at a second point in time with the camera;
   wherein;
   a first active partial surface of the matrix chip is used for the first picture and a second active partial surface of the matrix chip is used for the second picture, and in that the first active partial surface and the second active partial surface are not identical;
   and further wherein the second active partial surface is offset compared to the first active partial surface by a prescribed offset in the direction of the material web length (y) and/or in the direction of the material web width (x); and
   further wherein a time lag between the first and the second picture either is fixed in advance or adjusted according to the material web movement and is a function of a first trigger which triggers the first picture at the first point in time and a second trigger which triggers the second picture at a second point in time.

2. The method according to claim 1, wherein a size and/or a position of the first and second active partial surfaces of the matrix chip and thereby the field of vision of the camera in the direction of the material web length (y) and/or in the direction of the material web width (x) may be dynamically adjusted.

3. The method according to claim 1, wherein the first portion and the second portion are two identical material web portions; or in that the first portion and the second portion are two different material web portions.

4. The method according to claim 1, wherein the first picture is part of a first sequence of pictures of the material web and the second picture is part of a second sequence of pictures of the material web, in particular wherein a first sequence is created with a plurality of first pictures in order to produce the first sequence of pictures of the material web and a second sequence is created with a plurality of second pictures in order to produce the second sequence of pictures of the material web.

5. The method according to claim 1, wherein the material is lit with a first type of lighting for the first and second pictures; or in that the material web is lit with a first type of lighting for the first picture and the material web is lit with a second type of lighting for the second picture.

6. The method according to claim 5, wherein the taking of further pictures of corresponding further portions at corresponding further points in time using corresponding further active partial surfaces of the matrix chip, wherein the further portions are identical to the first portion and/or the second portion, and optionally wherein further types of lighting are used to light the material web for the further pictures.

7. The method according to claim 1, wherein a field of vision of the camera is designed to cover at least the entire width of the material web, in particular wherein the field of vision of the camera in the direction of the material web width (x) is greater than the material web width; optionally wherein the first and second active partial surfaces are adjusted on the basis of a signal from a material web position sensor, in particular a size and/or a position of the first and second active partial surfaces in the direction of the material web width (x) is adjusted.

8. A device for monitoring and/or inspecting material webs which are moving in the direction of a material web length (y) and/or a material web width (x), comprising:
   a camera which comprises a matrix chip, wherein partial surfaces of the matrix chip may be activated independently of one another; and
   a control unit;

wherein the control unit is designed to have a first partial surface of the matrix chip activated in order to take a first picture of a first portion of the material web at a first point in time; a second partial surface of the matrix chip activated in order to take a second picture of a second portion of the material web at a second point in time defining a time lag in relation to the first picture; wherein the first active partial surface and the second active partial surface are not identical;
- wherein the second active partial surface is offset compared to the first active partial surface by a prescribed offset in the direction of the material web length (y) and/or in the direction of the material web width (x); and
- further wherein the time lag between the first and the second picture either is fixed in advance or adjusted according to the material web movement and is a function of a first trigger which triggers the first picture at the first point in time and a second trigger which triggers the second picture at a second point in time.

9. The device according to claim 8, wherein a size and/or a position of the first and second active partial surfaces of the matrix chip and thereby the field of vision of the camera in the direction of the material web length (y) and/or in the direction of the material web width (x) may be dynamically adjusted.

10. The device according to claim 8, wherein the first portion and the second portion are two identical material web portions; or in that the first portion and the second portion are two different material web portions.

11. The device according to claim 8, wherein the device has a first lighting device so that the material web may be lit with a first type of lighting for the first and second pictures; or in that
- the device has first and second lighting devices so that a first type of lighting may be used for the first picture of the material web and a second type of lighting may be used for the second picture of the material web.

12. The device according to claim 11, wherein the control unit is designed to have a first picture respectively taken with the first type of lighting and a second picture respectively taken with the second type of lighting, these pictures being taken of a plurality of portions of the material web following one another in the direction of the material web length (y), wherein the first pictures together produce a first sequence of pictures of the material web and the second pictures produce a second sequence of pictures of the material web.

13. The device according to claim 11, wherein the control unit is designed to have further partial surfaces of the matrix chip activated in order to take further pictures of corresponding further portions at corresponding further points in time, wherein the further portions are identical to the first portion and/or the second portion, and optionally wherein the device comprises further lighting devices so that the material web may be lit with further types of lighting for the further pictures.

14. The device according to claim 8, wherein a plurality of cameras are provided with a matrix chip, wherein the cameras are arranged distributed over the material web width so that the fields of vision of the plurality of cameras in the direction of the material web width (x) adjoin one another or overlap, wherein the control unit is designed to have the plurality of cameras take corresponding first and second pictures and to have the first and second pictures combined to form two coherent sequences of pictures.

15. The device according to claim 8, wherein at least one camera is provided on a front side of the material web and at least one camera is provided on a rear side of the material web, wherein the control unit is designed to have first and second pictures respectively taken of the front side and the rear side of the material web.

* * * * *